(12) United States Patent
Adams et al.

(10) Patent No.: US 11,876,392 B2
(45) Date of Patent: Jan. 16, 2024

(54) SECURITY SYSTEM WITH USB SENSOR

(71) Applicant: SE-KURE CONTROLS, INC., Franklin Park, IL (US)

(72) Inventors: David M. Adams, Stone Park, IL (US); Emily Craig, Westmont, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 609 days.

(21) Appl. No.: 16/740,768

(22) Filed: Jan. 13, 2020

(65) Prior Publication Data

US 2021/0218254 A1    Jul. 15, 2021

(51) Int. Cl.
*H02J 7/00*    (2006.01)

(52) U.S. Cl.
CPC ........ *H02J 7/0036* (2013.01); *H02J 7/00034* (2020.01); *H02J 7/0047* (2013.01); *H02J 7/00302* (2020.01); *H02J 7/00306* (2020.01); *H02J 2207/30* (2020.01); *H02J 2207/40* (2020.01)

(58) Field of Classification Search
CPC .................................................. H02J 7/0036
USPC .......................................................... 320/107
See application file for complete search history.

(56) References Cited

U.S. PATENT DOCUMENTS

| | | | | |
|---|---|---|---|---|
| 6,191,552 B1* | 2/2001 | Kates | ................. | H02J 7/0013 320/112 |
| 6,459,374 B1* | 10/2002 | Rand | ................. | G08B 13/1418 340/568.2 |
| 10,337,719 B2* | 7/2019 | Chien | ................. | A63H 23/08 |
| 2002/0130638 A1* | 9/2002 | Sherman | ................. | G06F 1/266 320/134 |
| 2007/0132733 A1* | 6/2007 | Ram | ................. | G06F 3/03544 345/163 |
| 2008/0094210 A1* | 4/2008 | Paradiso | ................. | H04L 12/2827 340/540 |
| 2017/0292997 A1* | 10/2017 | You | ................. | H01M 10/482 |
| 2018/0102645 A1* | 4/2018 | Chong | ................. | G06F 1/26 |
| 2019/0123494 A1* | 4/2019 | Gustafsson | ................. | H01R 13/6683 |

FOREIGN PATENT DOCUMENTS

KR         20140027605      *  3/2014

* cited by examiner

*Primary Examiner* — Yalkew Fantu
(74) *Attorney, Agent, or Firm* — Wood, Phillips, Katz, Clark & Mortimer

(57) ABSTRACT

A USB Type C sensor is disclosed for use with an alarm system for monitoring a chargeable electrical device having a USB Type C port. A sensor comprises a first cable having a USB Type C plug receivable in the USB Type C port. A second cable has a second USB plug receivable in a power source. A third cable has an alarm plug receivable in an alarm receptacle for the alarm system, in use. A housing is operatively connected to the first, second and third cables. A sensor circuit is in the housing and electrically connects the second USB plug to the USB Type C plug to charge a chargeable electrical device to be monitored. A switch circuit monitors a configuration channel of the USB Type C port to determine if the first cable is connected to the chargeable electrical device and responsive thereto controls a switch electrically connected to the alarm plug so that the alarm system monitors status of the switch.

20 Claims, 5 Drawing Sheets

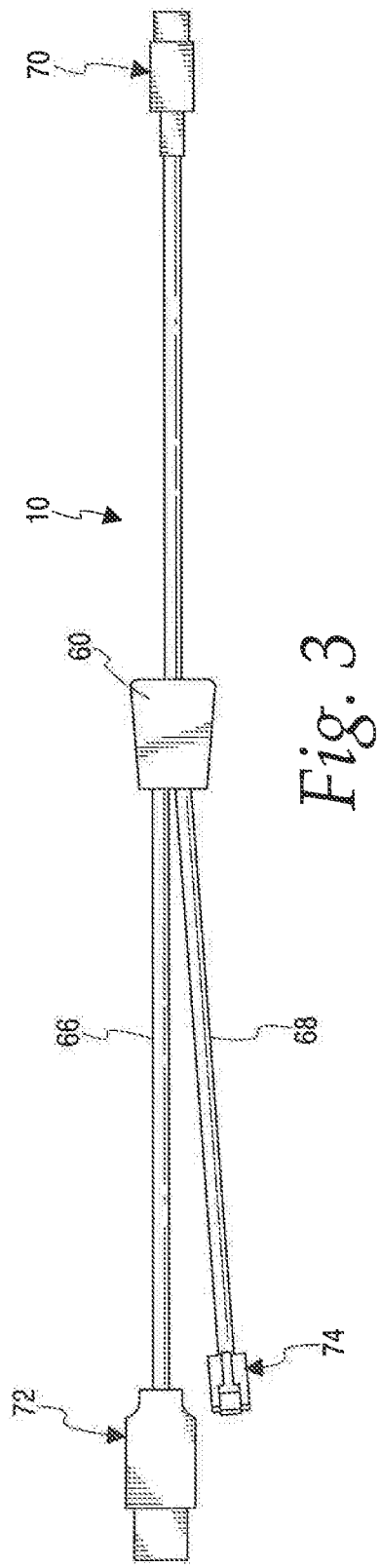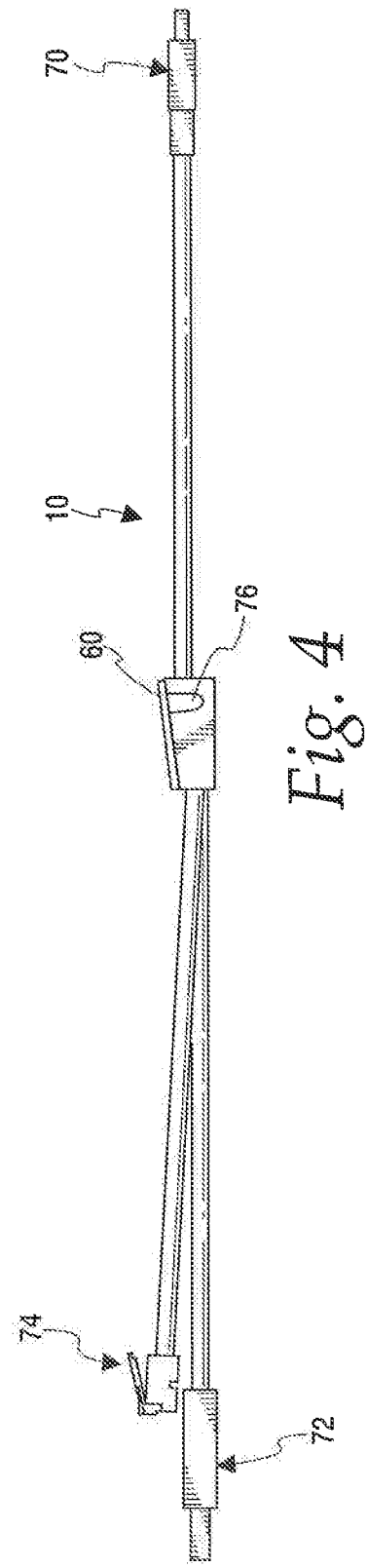

SECURITY SYSTEM WITH USB SENSOR

BACKGROUND OF THE INVENTION

Field of the Invention

The present invention relates to security alarms and charging systems and, more particularly, to a security system using a USB sensor.

Background Art

Retail and wholesale merchandisers direct substantial attention to the nagging and costly problem associated with the theft and/or damage of costly display products on their premises. With the predominance of smaller and portable electronic apparatus, the ease with which pilferers and shoplifters can quickly and easily remove such goods from display cases and display racks has intensified. At the same time, the availability of such products has skyrocketed, resulting in more and more valuable products being taken or tampered with. As locks and other security devices have become more sophisticated, so too have the individuals and methods for circumventing the operation of conventional security devices and particularly alarm sensing devices.

Moreover, many such electronic devices are battery powered and require that the devices be periodically charged. Ideally, the consumer will see the device in operation requiring that it maintain an ample charge. Providing independent charging units for each such device, as well as providing charging devices in addition to the security systems, presents difficulties with respect to multiple cords, power adaptors, power receptacles, and the like. The ability to simultaneously charge the device while maintaining protection of an alarm system is preferable.

Leyden et al. U.S. Pat. No. 8,692,672, assigned to the Applicant herein, describes an integrated charger and alarm unit. This includes a plurality of alarm receptacles in a housing each for selectively receiving a sensor cord for a sensor that senses security status of one of a plurality of chargeable devices. A plurality of charging receptacles in the housing selectively receive a power cord for charging one of the chargeable devices. The sensor cord is connected to a sensor that includes an electrical contact which completes an electrical circuit when the sensor is attached to the chargeable device. As such, the integrated charger and alarm unit is presently used with separate sensors and power cords. This requires the use of two separate cables and a sensor which must be attached to the device.

Advantageously, a single cable assembly would be used to power the device and monitor security status of the device. Such sensors would advantageously be usable with existing integrated charger and alarm units, as well as with separate alarm units and power supplies.

The present invention is directed to improvements in security systems.

SUMMARY

In accordance with the invention, the above desires are satisfied using a USB sensor for simultaneously charging a chargeable device and sensing security status of the chargeable device.

In accordance with one aspect, there is disclosed a USB sensor for use with an alarm system for monitoring a chargeable electrical device having a USB port with a configuration channel. The sensor comprises a first cable having a first USB plug receivable in the USB port, in use. A second cable has a second USB plug receivable in a power source. A third cable has an alarm plug receivable in an alarm receptacle for the alarm system. A housing is operatively connected to the first, second and third cables. A sensor circuit is in the housing. The sensor circuit electrically connects the second USB plug to the first USB plug to charge a chargeable electrical device to be monitored. A switch circuit monitors the configuration channel to determine if power is being provided to the chargeable electric device and responsive thereto controlling a switch electrically connected via alarm plug so that the alarm system monitors status of the switch.

It is a feature that the first USB plug comprises a USB Type C plug.

It is another feature that the second USB plug comprises a USB Type A plug.

It is a further feature that the alarm plug comprises a modular plug.

It is yet another feature that the switch circuit comprises an inverter having an input electrically connected to the configuration channel and an output electrically connected to the switch. The switch may comprise an analog switch.

It is an additional feature to provide a backup power supply circuit electrically connected to the second plug for powering the sensor circuit in the absence of power from the power source. The backup power supply may comprise a voltage divider circuit connected to the second USB plug and a capacitor electrically connected to the voltage divider circuit wherein the capacitor is charged while power is supplied to the second USB plug.

It is an additional feature that the sensor circuit further comprises an indicator electrically connected to the alarm plug and the indicator is controlled by the alarm system. The indicator may comprise an LED.

There is disclosed in accordance with another aspect a USB Type C sensor for use with an alarm system for monitoring a chargeable electrical device having a USB Type C port. A sensor comprises a first cable having a USB Type C plug receivable in the USB Type C port. A second cable has a second USB plug receivable in a power source. A third cable has an alarm plug receivable in an alarm receptacle for the alarm system, in use. A housing is operatively connected to the first, second and third cables. A sensor circuit is in the housing and electrically connects the second USB plug to the USB Type C plug to charge a chargeable electrical device to be monitored. A switch circuit monitors a configuration channel of the USB Type C port to determine if the first cable is connected to the chargeable electrical device and responsive thereto controls a switch electrically connected to the alarm plug so that the alarm system monitors status of the switch.

More particularly, there is disclosed herein a USB type C sensor including a housing having a circuit connected to a USB type C cable for connection to the chargeable device. Power is supplied to the sensor through a USB Type A connector. Sensor lines are connected to the housing via a modular connector for connection to a conventional alarm system.

In one aspect, the sensor passes power from the USB Type A connector to the USB Type C connector to power the device.

In another aspect, the sensor includes a capacitor that is charged when the USB Type A connector is connected to a power source. When the power to the connector is removed, then the sensor uses the capacitor to supply power to the circuit until power is restored.

In another aspect, the USB Type C cable includes a CC line used as a configuration channel. The sensor includes a circuit for monitoring status of the CC line to selectively operate an electronic switch for connection to the alarm system. If the sensor line is cut or the cable is removed from the device being protected, then the CC line will go high and the electronic switch is turned off which is detected as an alarm condition.

In another aspect, the alarm system operates an indicator on the sensor for indicating an alarm condition.

Further features and advantages of the invention will be readily apparent from the specification and from the drawings.

BRIEF DESCRIPTION OF THE DRAWINGS

FIG. 3 is a top plan view of the USB sensor;

FIG. 4 is a side elevation view of the USB sensor;

DETAILED DESCRIPTION OF THE PREFERRED EMBODIMENT

The disclosed USB sensor is described herein for use with providing power to and monitoring connection of the sensor to a chargeable electronic device having a USB port. The chargeable electronic device could be a mobile phone, tablet, or other device powered by a power source connected to the device via a USB connector, such as a USB Type C plug. The sensor otherwise provides separate connections to an AC power source and an alarm system. The USB sensor described herein is particularly adapted to be used with a device accepting a USB Type C plug having a configuration channel. However, the concepts of the disclosed USB sensor could be adapted to other plug configurations, or other type designators, that include a configuration channel or the equivalent. The USB sensor disclosed herein is particularly adapted to determine if the plug is electrically connected to the device being protected.

Figure 1:
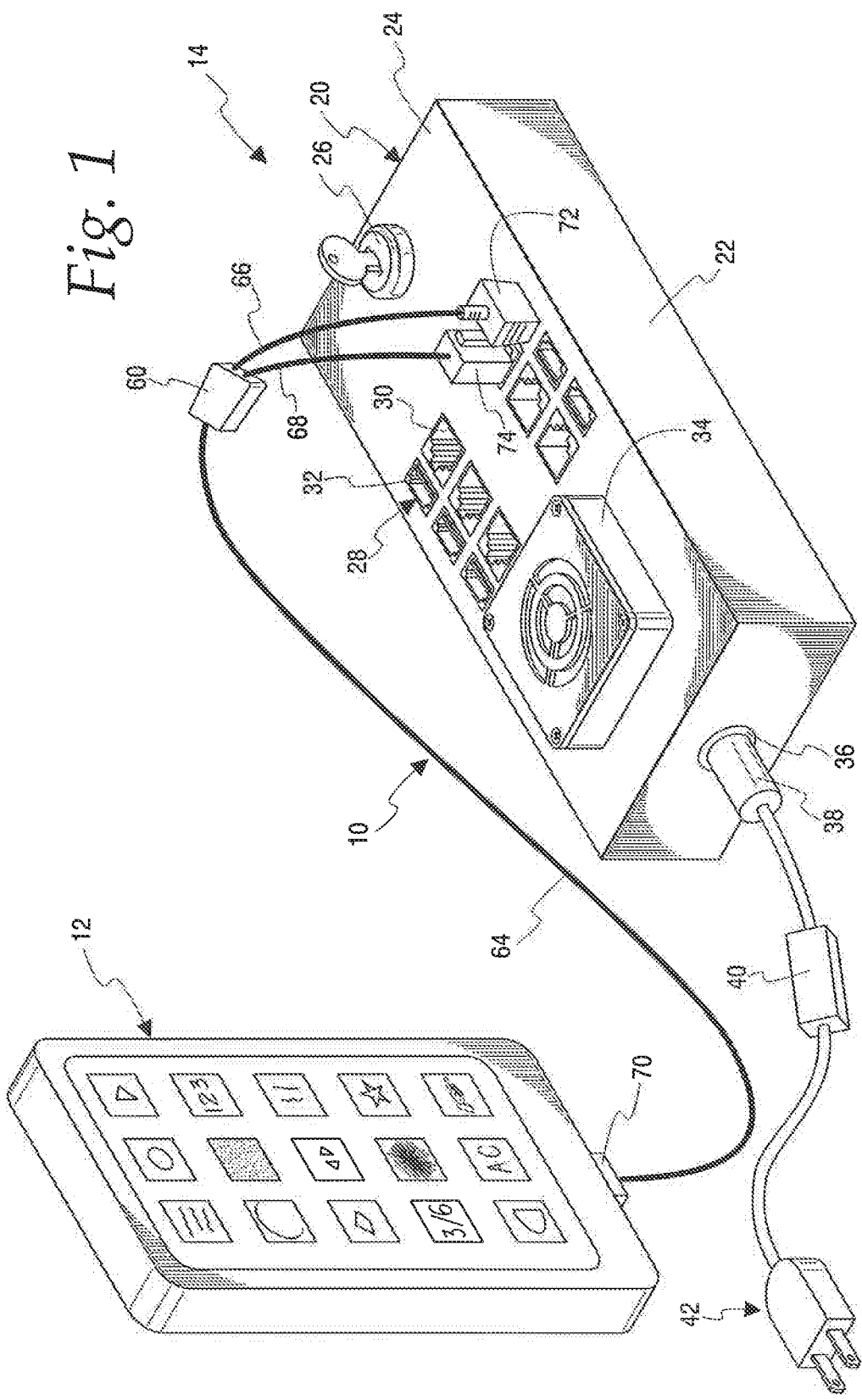
FIG. 1 is a perspective view of an integrated charger and alarm unit used with the USB sensor in accordance with the invention.

Referring initially to FIG. 1, a USB Type C sensor 10 is shown for use at a point of purchase display for a chargeable portable electronic device 12 and connected to an integrated charger and alarm unit 14. The device 12 may be of any design and includes a rechargeable battery. Many of such devices, as currently designed, utilize a USB port for receiving a USB Type C connector. In normal use, a USB Type-C to USB Type-A cable is used for connecting to a power adaptor connected to a conventional AC source.

While the sensor 10 is described herein in connection with integrated charger and alarm unit 14, the sensor could be used with other security systems and may be connectable to a separate power source, as will be apparent. The sensor 10 is not limited to use with the indicated unit 14.

The integrated charger and alarm unit 14 is adapted to provide power to selectively charge the device 12 and at the same time to monitor security status of the device 12 via a sensor. The integrated charger and alarm unit may be as described in detail in applicant's U.S. Pat. No. 8,692,672, the specification of which is incorporated by reference herein.

The integrated charger and alarm unit 14 comprises a housing 20 of parallelepiped construction including a base 22 and a removable cover 24. A lock 26 selectively secures the cover 24 to the base 22 in any known manner and also arms the unit 14. The illustrated housing 20 supports six receptacle pairs 28 (although twelve pairs 28 could be provided), one of which is labeled, each comprising an alarm receptacle 30 and a charging receptacle 32. The alarm receptacle 30 comprises a conventional six position modular receptacle. The charging receptacle 32 comprises a USB Type A receptacle for receiving a USB Type A plug. As will be apparent, other types of receptacles can be used depending on connectors used on the sensor 10.

The housing 20 includes a cooling fan 34. A power receptacle 36 in the housing is adapted to receive a locking connector 38. The locking connector 38 receives DC power from an AC/DC adaptor 40 which is in turn connected to a plug 42 for connection to an AC electrical power source.

Figure 2:
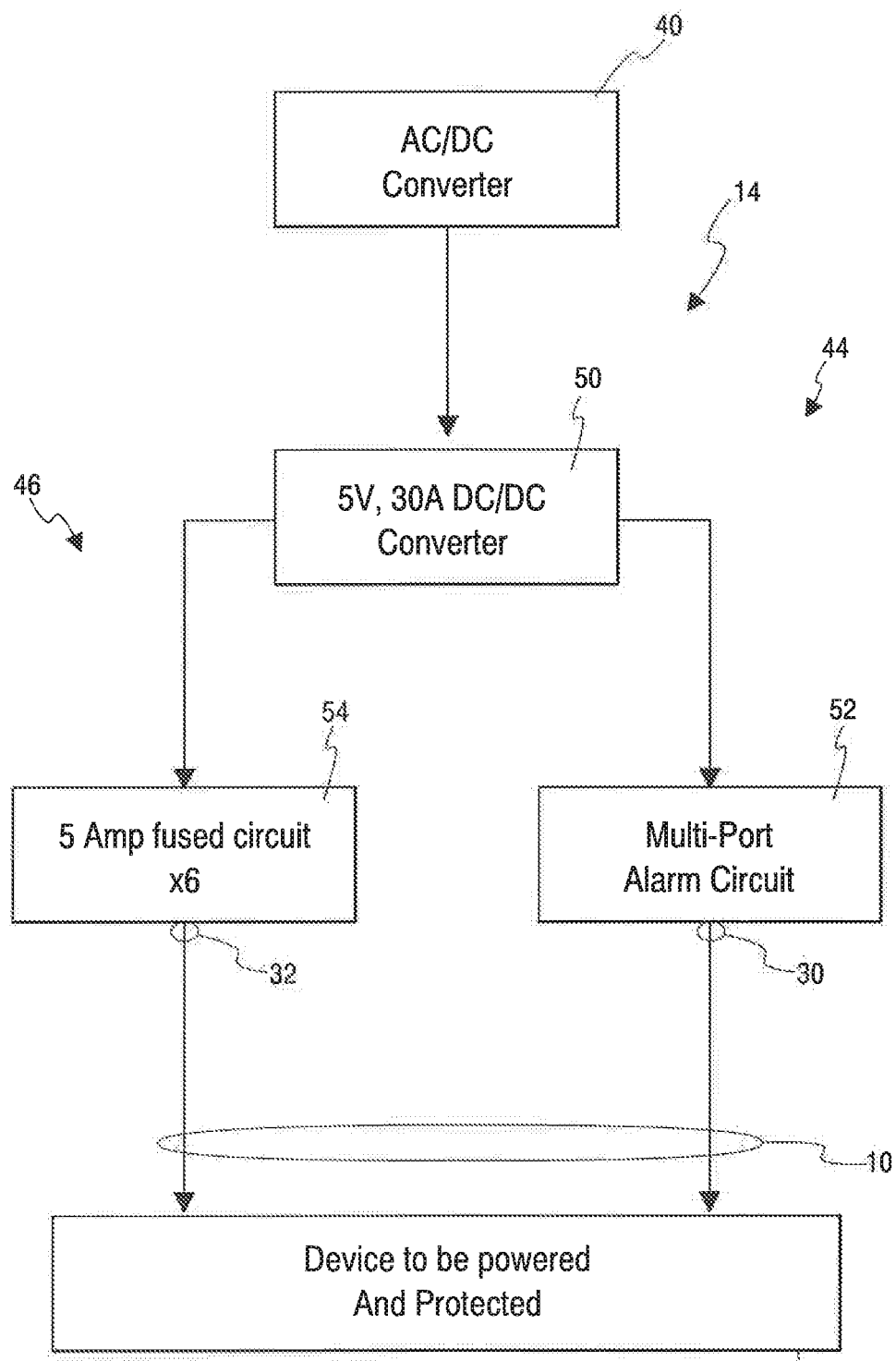
FIG. 2 is a block diagram of an electrical circuit for the charger and alarm unit of FIG. 1.

Referring to FIG. 2, a block diagram illustrates circuitry of the integrated charger and alarm unit 14. Power is supplied via the AC/DC converter 40. The circuit includes an alarm channel 44 and a power channel 46. A DC/DC converter circuit 50 of conventional construction powers both channels 44 and 46. The alarm channel 44 includes a multi-port alarm circuit 52. The multi-port alarm circuit 52 is described in detail in the previously referenced U.S. Pat. No. 8,692,672, the specification of which is incorporated by reference herein, and includes an alarm microcontroller and alarm matrix. The alarm matrix is adapted for connection to six or twelve sensors and in particular is connected to the alarm receptacles 30. The alarm microcontroller is a programmed microcontroller adapted to sense the status of up to six or twelve of the USB Type C sensors 10 and particularly monitor the status of an electrical switch in each sensor 10, as described below. The alarm microcontroller also controls indicators in each sensor 10, as described below, in a conventional manner.

The power channel 46 includes and a five-amp fuse circuit 54 for connection to the charging receptacles 32. Thus, the power channel 46 provides power to six or twelve charging receptacles 32. As is apparent, any number of charging receptacles could be provided, as desired.

Referring to FIGS. 3 and 4, the sensor 10 is illustrated. The sensor 10 comprises a housing 60 housing a sensor circuit 62, see FIG. 5. Extending from the housing 60 are a first cable 64, a second cable 66 and a third cable 68. The first cable 64 terminates in a conventional USB Type C plug 70. The second cable 66 terminates with a conventional USB Type A plug 72. The third cable 68 terminates in a conventional six position modular plug 74. The housing includes an LED alarm indicator 76, see FIG. 4. The USB Type A plug 72 is for insertion in the charging receptacle 32 for powering the device 12 via the USB Type C plug 70. The modular plug 74 is receivable in the modular receptacle 30 for interfacing with the alarm circuitry 50 in the unit 14.

Figure 5:
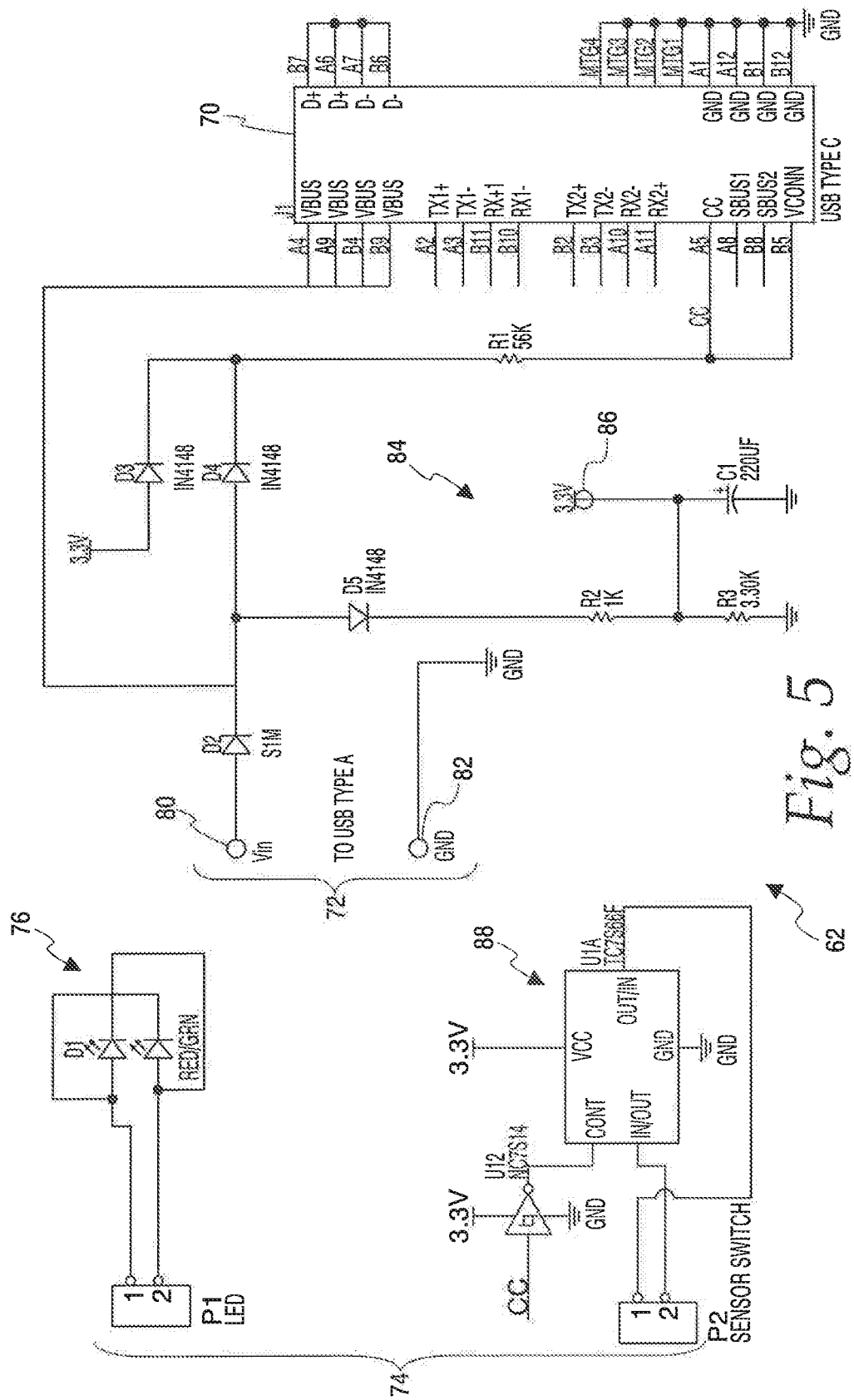
FIG. 5 is an electrical schematic of circuitry for the USB sensor.

Referring to FIG. 5, the sensor circuit 62 is illustrated in schematic form. The USB Type A plug 72 is connected to a voltage input, or Vin node, 80 and a ground node 82. The Vin node 80 receives the five-volt supply from the converter 50 of FIG. 2. The Vin node 80 is connected via a rectifier D2 to the Vbus terminals of the USB Type C connector 70. This provides power via the USB Type C plug 70 to the device 12. The rectifier D2 is also connected to a backup supply circuit 84 consisting of a diode D5 connected in series with a voltage divider made by resistors R2 and R3. The junction between the resistors R2 and R3 is connected to a storage capacitor C1 and also a node 86 providing 3.3 volt supply to the sensor circuit 62. The rectifier D2 is also connected via a diode D4 and resistor R1 to the configuration channel CC node of the USB Type C plug 70 and the VCONN terminal. The resistor R1 is also connected via a diode D3 to the 3.3 volt supply.

The CC line of the USB Type C plug 70 can be used to monitor for a valid connection of the plug 70 to the chargeable device 12. Particularly, the sensor circuit 62 uses the CC line as a trigger for an electronic switch circuit 88. The CC line is connected via an inverter U12 to a single analog switch U1A at the control input CONT. The input and output of the switch U1A are connected via a terminal block P2 which is in turn connected to the modular plug 74. The modular plug 74 is also connected via a terminal block P1 to the indicator 76 which comprises a red/green LED D1.

When the USB Type A plug 72 is connected to a power source and the USB Type C plug 70 is connected to a device, such as the chargeable device 12, then power is supplied to the device 12. When the plug 70 is connected to the device 12, the CC line is pulled low. The inverter U12 inverts the signal to close the switch U1A. The closed switch state is sensed by the alarm unit 14, via the modular plug 74, to indicate proper operation. If the USB Type C plug 70 is removed from the device 12, or the first cable 64 to the USB Type C plug 70 is cut, then the CC line will go high and the inverter U12 inverts the signal to open the electronic switch U1A causing the alarm unit 14 to sense an alarm condition. The alarm unit 14 will provide an audio alarm and send a signal to the red/green LED indicator 76 to illuminate the red LED D1 to indicate an alarm condition of the sensor 10, If the third cable 68 is cut or the modular plug 74 is unplugged, then the switch U1A is disconnected from the alarm unit 14 therefore opening the circuit to indicate an alarm condition.

With the described circuit, power from the USB Type A plug 72 is provided directly to the USB Type C plug 70 to power the device. At the same time, the capacitor C1 is charged. If power is disconnected from the USB Type A plug 72, the sensor circuit 62 will switch over to use the backup power circuit 84, Power is then supplied to the node 86 from the charge stored in the capacitor C1. Power is then supplied to the sensor circuit 62 from this alternative source until power is again restored.

Figure 6:
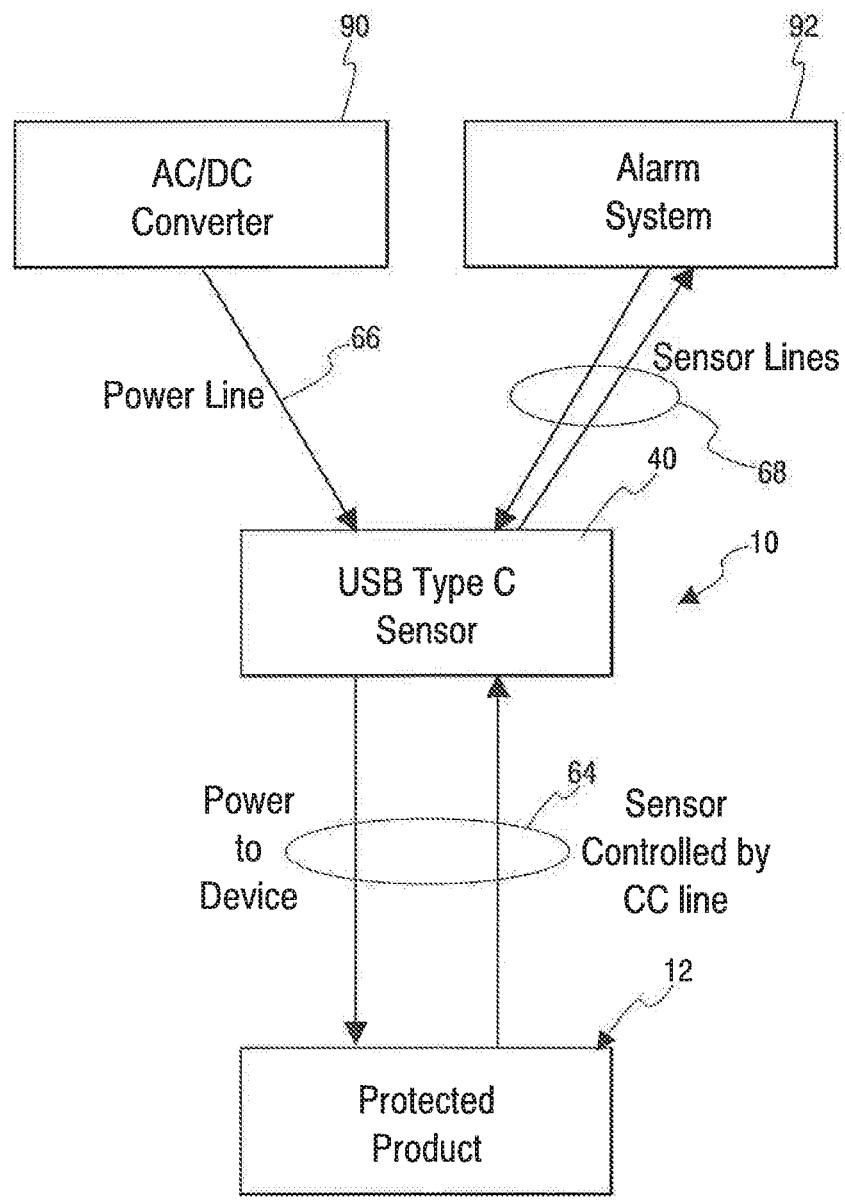
FIG. 6 is a block diagram illustrating use of the USB sensor with separate power supply and alarm system.

As described above, the sensor 10 is connected to an integrated charger and alarm unit 14. Alternatively, and with reference to FIG. 6, the sensor 10 could be connected to a separate AC power supply converter 90 and alarm system 92. The converter 90 can be a conventional converter device provided with a phone or tablet and the alarm system simply monitors status of the USB Type C sensor 10 and control of the LED 76, as described above.

Thus, in accordance with the invention, a USB Type C sensor uses the CC line of the USB Type C plug as a trigger for an electronic switch contained within the sensor and uses a capacitor to provide backup power for the sensor in the absence of a power source.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A USB sensor for use with an alarm system for monitoring a chargeable electrical device having a USB port with a configuration channel, comprising:
   a sensor housing;
   a first cable extending from the sensor housing and having a first USB plug receivable in the USB port, in use;
   a second cable extending from the sensor housing and having a second USB plug receivable in a power source;
   a third cable extending from the sensor housing and having an alarm plug receivable in an alarm receptacle for the alarm system, in use; and
   a sensor circuit in the sensor housing, the sensor circuit electrically connecting the second USB plug to the first USB plug to charge a chargeable electrical device to be monitored, and comprising a switch circuit for monitoring the configuration channel of the USB port to determine if power is being provided to the chargeable electrical device and responsive thereto controlling a switch electrically connected to the alarm plug so that the alarm system monitors status of the switch.

2. The USB sensor of claim 1 wherein the first USB plug comprise a USB Type C plug.

3. The USB sensor of claim 1 wherein the second USB plug comprises a USB type A plug.

4. The USB sensor of claim 1 wherein the alarm plug comprises a modular plug.

5. The USB sensor of claim 1 wherein the switch circuit comprises an inverter having an input electrically connected to the configuration channel and an output electrically connected to the switch.

6. The USB sensor of claim 5 wherein the switch comprises an analog switch.

7. The USB sensor of claim 1 further comprising a backup power supply circuit electrically connected to the second USB plug for powering the sensor circuit in the absence of power from the power source.

8. The USB sensor of claim 7 wherein the backup power supply circuit comprises a voltage divider circuit connected to the second USB plug and a capacitor electrically connected to the voltage divider circuit wherein the capacitor is charged while power is supplied to the second USB plug.

9. The USB sensor of claim 1 wherein the sensor circuit further comprises an indicator electrically connected to the alarm plug and the indicator is controlled by the alarm system.

10. The USB sensor of claim 9 wherein the indicator comprises an LED.

11. A USB Type C sensor for use with an alarm system for monitoring a chargeable electrical device having a USB Type C port, comprising:
    a sensor housing;
    a first cable extending from the sensor housing and having a USB type C plug receivable in the USB type C port, in use;
    a second cable extending from the sensor housing and having a second USB plug receivable in a power source;
    a third cable extending from the sensor housing and having an alarm plug receivable in an alarm receptacle for the alarm system, in use;

and a sensor circuit in the sensor housing, the sensor circuit electrically connecting the second USB plug to the USB type C plug to charge a chargeable electrical device to be monitored, and comprising a switch circuit for monitoring a configuration channel of the USB Type C port to determine if he first cable is connected to the chargeable electrical device and responsive thereto controlling a switch electrically connected to the alarm plug so that the alarm system monitors status of the switch.

12. The USB sensor of claim 11 wherein the sensor circuit comprise a rectifier electrically connected between the second USB plug and the USB type C plug.

13. The USB sensor of claim 11 wherein the second USB plug comprises a USB type A plug.

14. The USB sensor of claim 11 wherein the alarm plug comprises a modular plug.

15. The USB sensor of claim 11 wherein the switch circuit comprises an inverter having an input electrically connected to the configuration channel and an output electrically connected to the switch.

16. The USB sensor of claim 15 wherein the switch comprises an analog switch.

17. The USB sensor of claim 11 further comprising a backup power supply circuit electrically connected to the second USB plug for powering the sensor circuit in the absence of power from the power source.

18. The USB sensor of claim 17 wherein the backup power supply circuit comprises a voltage divider circuit connected to the second USB plug and a capacitor electrically connected to the voltage divider circuit wherein the capacitor is charged while power is supplied to the second USB plug.

19. The USB sensor of claim 11 wherein the sensor circuit further comprises an indicator electrically connected to the alarm plug and the indicator is controlled by the alarm system.

20. The USB sensor of claim 19 wherein the indicator comprises an LED.

* * * * *